Sept. 2, 1969 T. O. BUCK 3,464,218

HEAT EXCHANGE HOUSING FOR TELEVISION CAMERA AND THE LIKE

Filed Dec. 28, 1967

INVENTOR.
THOMAS OLAF BUCK
BY Walter Leuca
ATTORNEY

United States Patent Office 3,464,218

Patented Sept. 2, 1969

3,464,218

HEAT EXCHANGE HOUSING FOR TELEVISION CAMERA AND THE LIKE

Thomas Olaf Buck, Lake County, Ind., assignor to Meade Electric Company of Indiana, Inc., Hammond, Ind., a corporation of Indiana Filed Dec. 28, 1967, Ser. No. 694,207
Int. Cl. F25b *21/02;* H04n *5/00*
U.S. Cl. 62—3 4 Claims

ABSTRACT OF THE DISCLOSURE

A heat exchange housing for protectively containing a heat generating device such as a television camera comprising a generally rectangular box like structure. Channel means depending from the base longitudinally thereof to provide a passage therebetween. An opening in the base communicating the housing interior and the channel passageway. A heat conduction block in the housing extending through the opening into the passageway. Means for establishing a temperature gradient through the block. An air blower is connected to the housing to blow air through the passageway to cool the portion of the block extending into the passageway. The conduction block is adapted to connect with the television camera or the like so that heat transmission is readily afforded by means of conduction. Sight means is provided in one of the end walls of the housing to permit observation from the interior to the exterior of said housing. Spaced rails are connected to the base of the housing by which means the housing may be adjustably moved on its support base and by which means it is spaced above its support base.

This invention relates generally to housings and more particularly to heat exchange housings for television cameras and the like.

Devices such as television cameras are powered by electric current. A considerable portion of this energy is converted to heat and dissipated at the load which is within the camera unit. This heat generation is normally dissipated to atmosphere by providing vent apertures through which air circulates to convectly cool the camera unit. With the advent of closed circuit television for use in industry, many applications therein are in atmospheric environment which due to to excessive heat, dirt and dust, require systems for housing and cooling since such devices as television cameras, being precision devices, cannot satisfactorily operate at elevated temperatures without early failure of component parts resulting in poor performance and excessive maintenance.

Heretofore, the cooling systems provided for television cameras used in such unfavorable atmospheric environment that I am aware of are complex, expensive and bulky in that the cooling systems for cameras and housings therefor employ cooling water jackets, cool air purging, and mechanical refrigeration. Each of these prior practice methods have serious disadvantages. The water cooling and cool air purging systems require additional lines for supplying water or air, pumping and filtering means, adequate insulation on relatively long supply lines and additional maintenance for inspecting and repairing the supply lines to prevent damage to the camera equipment due to leakage or stoppage of the cooling medium. Mechanical refrigeration is equally disadvantageous in that such a system is bulky and expensive to install and maintain.

Accordingly, the object of my invention is to provide a heat exchange housing for television cameras and the like which utilizes electric current for motivating heat exchange and does not require an extraneously supplied cooling medium.

Another object of my invention is to provide a heat exchange housing which is easy and economical to manufacture and to maintain.

Still another object of my invention is to provide a heat exchange housing which is light in weight and compact in dimension.

Other objects and advantages of my invention will become apparent after a more careful study of the novel form, combination and arrangement of parts as shown and described in the following specification and accompanying drawing in which.

Figure 5:
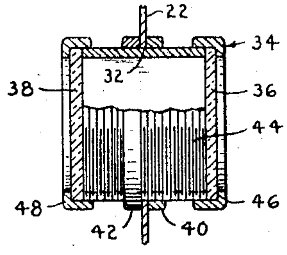
FIGURE 5 is a detail of the sight tube shown in section taken along lines 5—5 of FIGURE 2.

Referring now to the drawings wherein is shown a preferred embodiment of my invention, reference numeral 10 designates generally the heat exchange housing for protectively enclosing a television camera 12 or the like. Housing 10 comprises a base member 14 which is formed with upturned side walls 16 and 18, end walls 20 and 22 extending upright from base member 14, and a unitary cover member 24 shaped to provide a horizontal portion 26 and depending sides 28 and 30 which overlap base member side walls 16 and 18 and together therewith form the sides of housing 10. Front end wall 22 is provided with a circular aperture 32 through which is fitted sight tube 34. Sight tube 34 is provided with lens 36 and 38 supported space dapart therein to thermally seal aperture 32. As more clearly illustrated in FIGURE 5, sight tube 34 is connected to end wall 22 by screwing flange collars 40 and 42 on threaded sleeve portion 44 of sight tube 34, to tighten against the interior and exterior respectively, of end wall 22. Lens 36 and 38 are supported against the ends of sleeve 44 by shouldered rings 46 and 48 respectively, which are connected to the sleeve ends by screw engagement.

Figure 1:
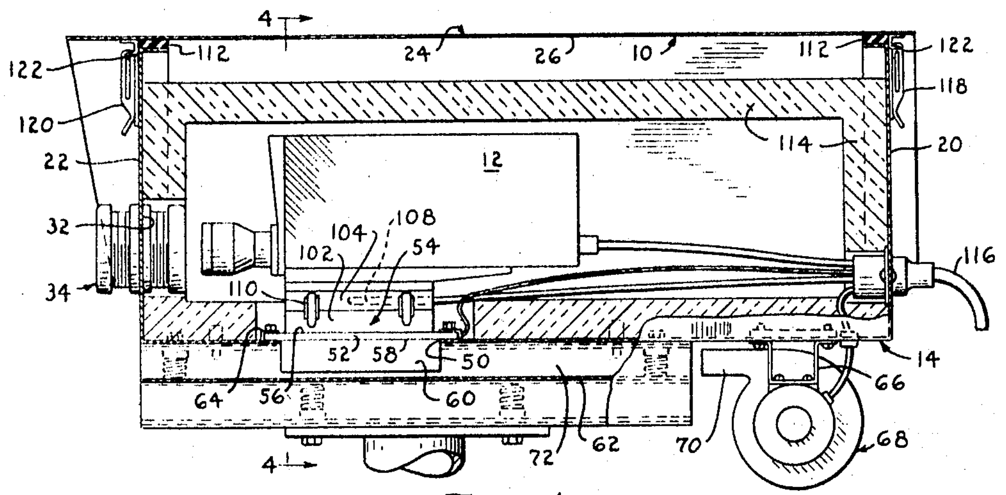
FIGURE 1 is a side elevation of the heat exchange housing of my invention showing the interior thereof by breaking away a portion of the side thereof; the housing is mounted on a base, the pedestal of which is shown in fragment.
Figure 2:
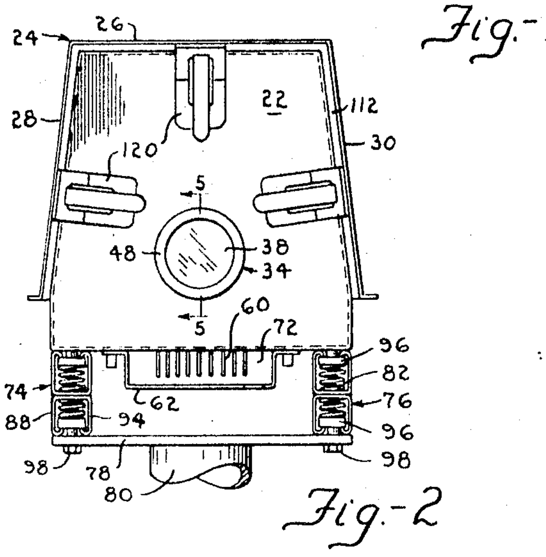
FIGURE 2 is a front end elevation of the housing of FIGURE 1.
Figure 3:
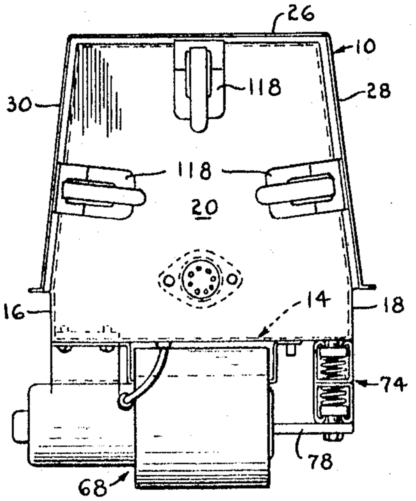
FIGURE 3 is a rear end elevation thereof.

I provide an aperture 50 in base member 14 over which is positioned the cooling plate 52 of a thermoelectric heat pump shown schematically and designated generally by numeral 54. As is well known, a thermoelectric heat pump comprises a semi-conducting metallic junction through which electric current is made to pass thereby cooling one side of the metallic junction and heating the other side thereof. In this application of the thermoelectric heat pump, cooling plate 52 is the semi-conducting metallic junction through which electric current is made to pass by being connected to the power circuit which supplies power to operate the television camera, so that surface 56 of cooling plate 52 absorbs heat and the other surface 58 of cooling plate 52 generates heat. I provide surface 58 with fins 60 extending downward therefrom and below base member 14 of housing 10. Connected to the bottom side of base member 14 and extending along the length thereof is channel member 62 which contains within the lateral confines thereof the heat dissipating fins 60 of cooling plate 48. Cooling plate 52 is connected to base member 14 in any convenient manner such as by bolt and clamp members 64 illustrated in FIGURE 1. Bracket means 66 is connected to base member 14 adjacent the rearward end of housing 10 so as to depend therefrom to support air blower 68. Discharge nozzle 70 of air blower 68 is directed to discharge the air longitudinally through passageway 72 provided between channel member 62 and base member 14 to dissipate the heat from fins 60.

Figure 4:
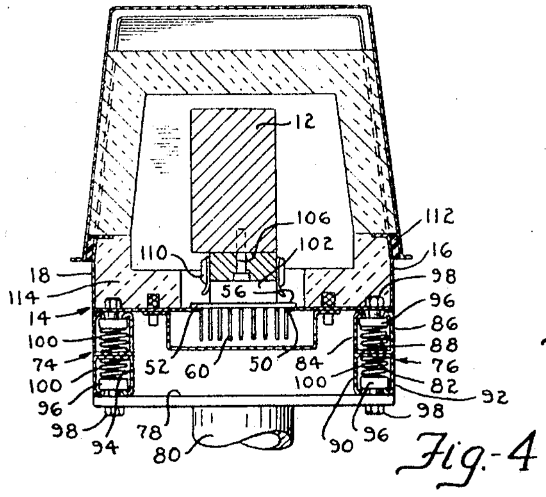
FIGURE 4 is a sectional end view taken along lines 4—4 of FIGURE 1.

Also connected to the bottom side of base member 14 of housing 10 are rail means 74 and 76 which serve to guide and space housing 10 relative to its means of support. Rail means 74 and 76 extend longitudinally along base member 14 adjacent the lateral sides thereof. Rail means 74 and 76 are connected to a support member such as mount plate 78 of pedestal 80 which supports the entire apparatus of this invention. I contemplate housing 10 to be longitudinally movable on rail means 74 and 76, and rail means 74 and 76 to be longitudinally movable on mount plate 78 for the purpose of adjustably positioning housing 10 on pedestal 80. I accomplish this by fabricating each rail means 74 and 76 from like channel members connected back to back to form a common web 82 such as by welding. With reference to FIGURE 4, the fabrication of rail 76 only will be described since rail 74 is identical in structure. The edge of side walls 84 and 86 of channel member 88 is curled inwardly along the longitudinal length thereof to provide a seat for supporting housing 10 along its base member 14. The edge of side walls 90 and 92 of channel member 94 is similarly formed to provide a seat for resting on mount plate 78. As stated above, channel members 88 and 94 are connected back to back to form a common web 82. The inwardly curled edge of side walls 84, 86, and 90, 92 of channel members 88 and 94, respectively, provide lipped edges spaced from the seating surface thereof for fitting in recesses or grooves formed in the face of nuts 96 which threadedly connect bolts 98. I further provide a coil spring 100 between web 82 and each nut 96 to urge nuts 96 against the lipped edges. The purpose for this is to allow for loosening and tighting of bolts 98 without holding nuts 96 when it is desired to adjust the longitudinal position of housing 10 relative to rail means 74 and 76, and when it is desired to adjust the longitudinal position of rail means 74 and 76 relative to mount plate 78.

Conduction block 102 is connected to side 56 of cooling plate 52 and is formed from any conveniently available high thermal conducting material such as aluminum. Adapter block 104 is likewise formed from the same material and is provided with bolt holes 106 by which means television camera 12 is connected thereto. A longitudinal hole is also provided in block 104 to receive a thermocouple pin 108 for thermostatic control of heat pump 50. Clamp devices 110 are provided on adapter block 104 and conduction block 102 to readily fasten the blocks together for a press fit connection to make good heat transfer connection.

Seal strip 112 is provided between end walls 20 and 22, upturned side walls 16 and 18 of base member 14 and the overlapping edges of cover member 20; and insulating material 114 is provided on the interior surface of end walls 20 and 22, base member 14 and cover member 24 throughout excepting the heat pump unit 54 and sight tube 32.

Clasp devices 118 and 120 are secured to end walls 20 and 22 respectively, which operate to releasably engage hanger members 122 secured to cover member 24 at positions thereon in alignment with the clasp devices to draw the edges of cover member 24 tightly against seal strip 112.

In operation, my invention comprises a simple, economically structured, insulated housing for containing a television camera or the like which is readily, easily and firmly connected to a heat transfer device 54. The electric power through circuit means 116 provided to operate the television camera unit also provides the energy for producing thermoelectric effect at the junction of the semiconductor material of cooling plate 52, the action of which establishes a temperature gradient between the side 56 thereof to which conduction block 102 is connected and side 58 to which fins 60 are connected. Since the current therethrough is in the direction to establish a temperature gradient so that the conduction block side of cooling plate 52 is colder and the fin side thereof is warmer than the ambient temperature, a heat generating device such as a television camera 12 mounted by means of adapter block 104 on conduction block 102 so as to conduct its heat to cooling plate 52, and an air blower device 68 provided for dissipating this heat appearing at fins 60, the heat pump will operate to maintain a temperature gradient between surfaces 56 and 58 of cooling plate 52. This operation accomplishes the heat transfer from a heat generating device such as a television camera or the like.

By the simple expedient of reversing the current through the power circuit of heat pump 54, a reverse temperature gradient may be established between surfaces 56 and 58 of cooling plate 52 and the heat pump may be employed to heat the device contained in the housing 10 if atmospheric conditions are such to require such a heat transfer.

It is obvious from the above description taken with the accompanying drawings, that I provide a simple and economical to manufacture housing which accomplishes a thermostatically controllable transfer of heat from the interior to the exterior of said housing, or the reverse thereof, utilizing only the electric energy which must nevertheless be provided for a television camera device or the like. Consequently cooling medium such as water or refrigerant is not necessary, enabling the use of my housing in locations which were heretofore impractical. It is understood of course that modifications may be made in details of structure of parts, and arrangement thereof without departing from the true spirit of my invention.

I claim:

1. A housing for the protective containment of a heat generating instrument comprising:
   - a base member, upright end walls, and a removable cover member formed to provide a unitary top wall and side walls,
     - said end walls and cover member being provided with clasp means for releasably connecting said end walls and cover member, and
     - one of said end walls having sight means for observation therethrough;
   - a conduit member depending from said base member longitudinally thereof to provide a passageway exterior of said housing;
   - said base member having an opening in said passageway;
   - a thermal conduction member on said base member over said opening therein having one side thereof extending into said housing and the other side thereof extending into said passageway of said conduit member;
   - fastening means provided on said thermal conduction member for releasably connecting said heat generating instrument thereto for heat transmission contact therebetween; and
   - blower means mounted on said base member operable to blow air through said passageway for cooling said other side of said thermal conduction member.

2. A housing for the protective containment of a television camera comprising:
   - a base member, upright end walls and a removable cover member formed to provide a unitary top wall and side walls,
     - said end walls and cover member being provided with clasp means for releasably connecting said end walls and cover member, and
     - one of said end walls having sight means for observation therethrough;
   - a conduit member depending from said base member longitudinally thereof to provide a passageway exterior of said housing;
   - said base member having an opening in said passageway;

a thermal electric cooling device on said base member over said opening therein having one side thereof extending into said housing and the other side thereof extending into said passageway of said conduit member;

a thermal conduction member connected to said thermal electric cooling device on said side thereof extending into said housing;

a second thermal conduction member connected to said television camera;

latch means provided on said first and second thermal conduction members for releasably connecting said thermal conduction members for heat transmission contact therebetween;

blower means mounted on said base member operable to blow air through said passageway for cooling said other side of said thermal electric cooling device;

base means for supporting said housing; and rail means connecting said base member and said base means to space said base member from said base means.

3. The housing of claim 2 wherein said rail means is further characterized by being connected to said base member so that said housing is longitudinally movable on said rail means.

4. The housing of claim 2 wherein said rail means is further characterized by being connected to said base means so that said housing is longitudinally movable relative to said base means.

References Cited

UNITED STATES PATENTS

| | | | |
|---|---|---|---|
| 3,126,498 | 3/1964 | Bendell | 62—3 X |
| 3,141,987 | 7/1964 | Altman | 178—6 X |
| 3,155,157 | 11/1964 | Anderson | 62—3 X |
| 3,277,238 | 10/1966 | Sharp | 178—6 X |
| 3,306,975 | 2/1967 | Dormay | 178—6 X |

WILLIAM J. WYE, Primary Examiner

U.S. Cl. X.R.

178—6